United States Patent [19]

Nedyalkov

[11] 4,345,434

[45] Aug. 24, 1982

[54] SEA AND OCEAN WAVE ENERGY CONVERTER

[75] Inventor: Ivan P. Nedyalkov, Sofia, Bulgaria

[73] Assignee: Institute Za Yadreni Izsledvaniya I Yadrena Energetika, Sofia, Bulgaria

[21] Appl. No.: 91,247

[22] Filed: Nov. 5, 1979

[30] Foreign Application Priority Data

Nov. 3, 1978 [BG] Bulgaria .................... 41298

[51] Int. Cl.$^3$ .................... F03B 13/10; F03B 13/12
[52] U.S. Cl. .................... 60/398; 290/42; 405/76; 417/330
[58] Field of Search ............ 60/398; 290/42; 405/75, 405/76, 77; 417/330

[56] References Cited

U.S. PATENT DOCUMENTS

| | | | |
|---|---|---|---|
| 1,268,625 | 6/1918 | Rivers | 405/77 |
| 3,961,863 | 6/1976 | Hooper | 290/42 X |
| 4,123,667 | 10/1978 | Decker | 417/330 X |
| 4,141,670 | 2/1979 | Russell | 417/330 X |
| 4,193,265 | 3/1980 | Ootsu | 405/75 X |
| 4,204,406 | 5/1980 | Hopfe | 60/398 |

FOREIGN PATENT DOCUMENTS

| | | |
|---|---|---|
| 26755 | 6/1977 | Bulgaria . |
| 2289763 | 5/1976 | France ............ 60/398 |

*Primary Examiner*—Irwin C. Cohen

[57] ABSTRACT

A device for converting the energy of sea and ocean waves, including a turbogenerator connected by means of pipelines to input and output elements on which there are mounted ballast systems and stabilizers. The input and output elements are designed as a high pressure vessel and a low pressure vessel, respectively, each having a gas cushion. A high pressure compressor unit and a low pressure compressor unit are, respectively, mounted on these vessels and are connected to high pressure and low pressure gas tanks, respectively, and to the respective gas cushions. The converter is connected at at least two different points to the sea bottom by means of at least two flexible cords the length of at least one of which may be altered.

5 Claims, 3 Drawing Figures

SEA AND OCEAN WAVE ENERGY CONVERTER

This invention relates to the conversion of the energy of sea and ocean waves into electric power.

There is well known a device for the conversion of the energy of the gravitational waves, i.e. sea and ocean wind-formed waves, or dead or ground sea swell in which a series of input parallel converters are connected by means of an input collector manifold with a turbogenerator which on its turn is connected by means of an output collector-manifold to a series of parallel output converters which let out the water in the low part of the wave. In such devices, the input and output converters have independent sources of gas under pressure.

The device is maintained at a given level by means of a ballast system fitted to the converters and stabilizers.

The disadvantage of this device is the large number of input and output elements which makes this device very complicated. Furthermore, the flow should surmount the local resistances in its inflow in the input and outflow from the output collector or manifold as a result of which there occurs a decrease in the harnessed energy.

Another shortcoming of such a known device is that the independent sources of gas under pressure maintain the water in the input and output converters and this can vary over a wide range. When the level is very low, part of the gas can flow out of the converters and this results in a loss of part of the compressed air. Conversely, when we have a high level and a little volume of the gas cushion, the latter is inferior in its role as buffer and energy accumulator.

Furthermore, this device cannot be directed at a specified angle towards the wave front, and in this way an important reserve for increasing its smoothness of operation and improving its efficiency cannot be utilized.

It is among the objects of the present invention to eliminate the shortcomings of the prior device discussed above, by providing a device for converting sea and ocean wave power to electric power with improved efficiency, better stability with respect to the waves, and considerably better smoothness and regularity of the flow of water running through the turbine.

This problem has been solved by replacing the system of input converters and the input collector manifold by a high pressure vessel the length of which is at least equal to the length of the wave and the width of which is in the range of the length of the active part of the wave. Analogically, the system of output converters and the output collector manifold have been replaced by a low pressure vessel. The high pressure and the low pressure vessels are connected by means of pipelines to the turbogenerator group which converts the energy of the water flow to electricity. In its low part, the high pressure vessel has controls for admitting the water, an input guiding device in the form of blades connected to the high pressure vessel and disposed in it, the blades being inclined towards the turbine. In its lower part, the low pressure vessel has two systems of controls for discharging the water, these controls being located in such a way as to direct the water in two flows of opposite direction, perpendicular to the longitudinal axis of the low pressure vessel, and a guiding device associated with the low pressure vessel in the form of two rows of blades fitted outside the low pressure vessel and attached to it. Each row of blades of the guiding device of the low pressure vessel is symmetrical with the other row of blades, the symmetry being with respect to a vertical plane crossing the longitudinal axis of the low pressure vessel. A high pressure gas cushion is established in the high pressure vessel, the average pressure and mean volume of which can be regulated. In addition, the high pressure vessel is fixed to a high pressure gas tank which is connected to the high pressure gas cushion by means of a high pressure compressor unit including a compressor and a system of valves. The high pressure compressor unit is connected to the high pressure vessel and is designed to transfer the gas in both directions; it can also connect the high pressure gas cushion to the atmosphere.

The low pressure vessel forms a low pressure gas cushion whose mean pressure and mean volume can be regulated. A low pressure gas tank is connected to the low pressure vessel, and the tank is connected to the low pressure gas cushion of the low pressure vessel by means of a low pressure compressor unit to divert gas in both directions, such unit consisting of a compressor and a system of valves. The low pressure compressor unit permits the transfer of the gas from the low pressure gas cushion to the low pressure gas tank, and vice-versa; it can also connect the low pressure gas cushion to the atmosphere.

A high pressure, or a low pressure ballast system, is fixed to the high pressure vessel or to the low pressure vessel, respectively, the ballast system serving to control the specified depth of submergence of the device.

A high pressure oscillation compensating or a low pressure system is mounted to the high pressure, or low pressure, respectively, system to compensate vertical oscillations and those around the longitudinal axis.

The high pressure, low pressure, respectively, vessels are made in one or more sections which are interconnected by hinge devices operating along a horizontal axis, perpendicular to the longitudinal axis. Sealing between the individual sections is provided by flexible sleeve couplings. If the respective vessels have more than one section, the tanks, the ballast and compensation systems are also made in sections.

The sea and ocean wave converter is attached to the sea bottom at least in two different places along the length of the converter by means of flexible cords, and the length of at least of one of the flexible cords may be altered in such way as to form a specific angle between the longitudinal axis of the device and the wave crest. This alteration is made by means of a winch.

The sea and ocean wave converter is supplied with an automatic control system made up of automatic control units for the mean pressure of the gas cushion, units for the automatic control of the ballast system, a unit for the control of the turbogenerator unit, and a unit for controlling the angle between the device longitudinal axis and the direction of the wave crest. The individual control units are contained in a common control unit.

The turbogenerator unit is submerged to a sufficient depth in order to reduce the cavitation effect.

It is an advantage of this device that it is compact, so that the energy of water flow can be utilized to a maximum. Another advantage is that the gas tank to which the gas cushions are connected stabilize the water level in the high, or respectively the low pressure vessel. Furthermore, due to the improved disposition of the direction of the converter to the wave crest and the greater smoothness of the operating water flow, the capacity of the converter is improved and it has a higher efficiency.

An application of this invention is illustrated in the attached drawings, where:

Figure 1:
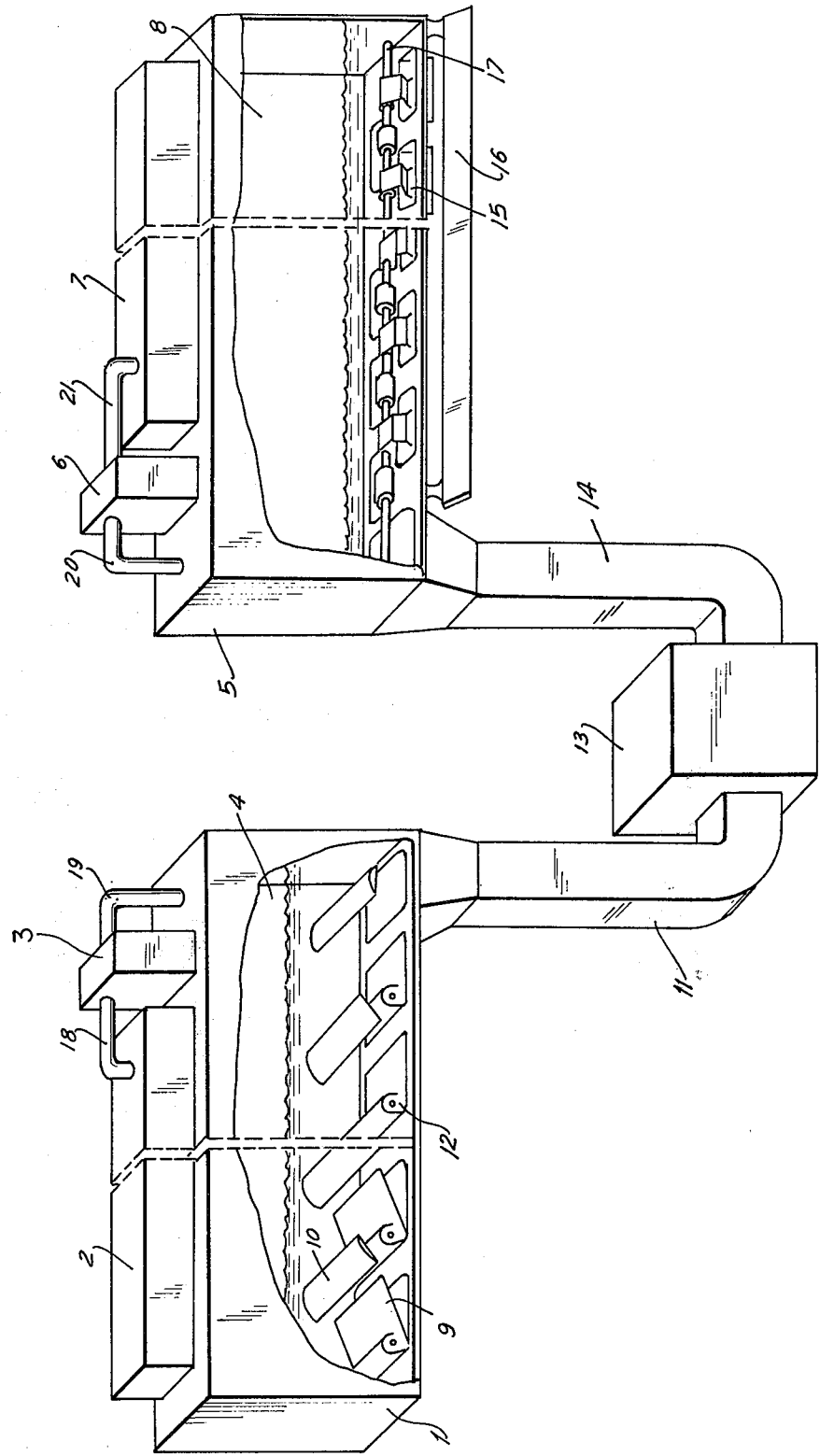
FIG. 1 is a partial section of the high pressure and the low pressure vessel.

The high pressure vessel 1 is a closed circuit vessel whose length is at least equal to the length of the waves, and whose width is in the range of the active part of the waves. In its lower part vessel 1 has input valves 9 in the form of flat members which open inwardly at a sharp angle in the direction of a turbogenerator 13 and which rotate around axes 12 of the input valves 9. The shafts (axes) 12 are perpendicular to the longitudinal axis for the high pressure vessel 1.

An input guiding unit 10 consists of blades which are fixed to the high pressure vessel 1 and are fitted in its lower part. Over the high pressure vessel 1 there is mounted a high pressure tank 2 and a high pressure compressor unit 3 for transferring gas in both directions. The high pressure compressor unit 3 for transferring gas in both directions consists of a compressor and a system of valves for changing the direction of gas flow. The high pressure compressor unit 3 may also serve as a two-way connection between the atmosphere and a high pressure gas cushion 4 occupying the upper part of pressure vessel 1. The high pressure compressor unit 3 for transferring gas in both directions is connected to the high pressure gas cushion 4 by means of high pressure connecting pipelines 18 and 19.

A low pressure vessel 5 is a closed-circuit vessel having a width in the range of the active part of the waves. Vessel 5 has in its lower part two systems of output valves 15 which open outwardly at an acute angle towards the vertical longitudinal plane of the low pressure vessel 5. The shafts 17 of the output valves 15 are parallel to the longitudinal axis of the low pressure vessel 5. The output guiding unit 16 has the shape of blades which are fitted outside the low pressure vessel 5 and symmetrically towards its vertical longitudinal plane, and are fixed to vessel 5. A low pressure gas tank 7 is connected by means of a low pressure gas pipeline 21 to a low pressure compressor unit 6 is connected to a low pressure gas cushion 8 which occupies the upper part of the low pressure vessel 5. The low pressure compressor unit 6 can also provide a two-way link between the atmosphere and the low pressure gas cushion 8.

The turbogenerator unit 13 is disposed at a sufficient depth under the level of the high pressure vessel 1 and the low pressure vessel 5, and is connected to the high pressure vessel 1 by means of an elastic input flexible hose 11 and to the low pressure vessel 5 by a flexible hose 14.

Figure 2:
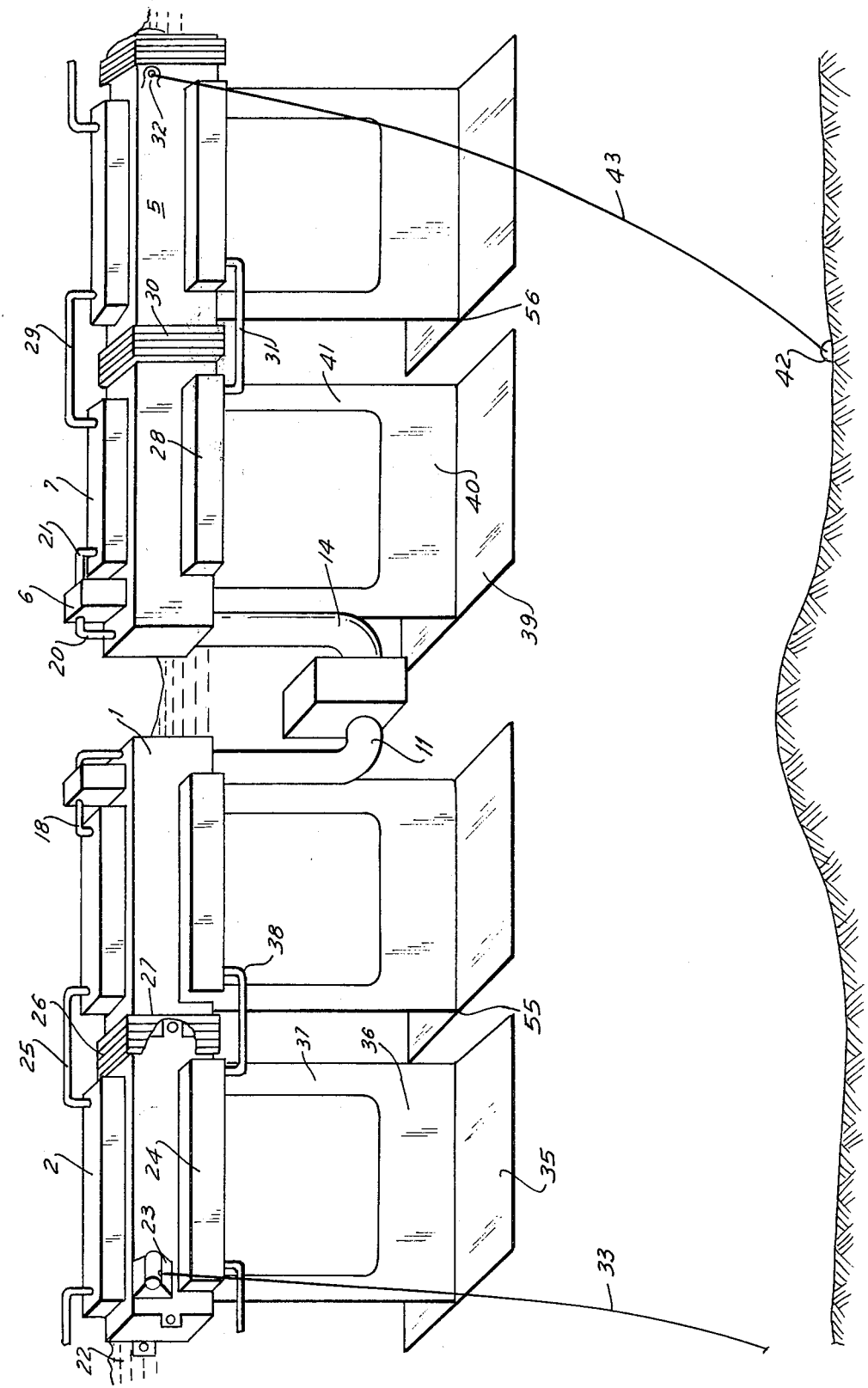
FIG. 2 is a general view of the sea and ocean wave converter.

The high pressure vessel 1 can be made in more than one section connected by means of hinges 27 (FIG. 2) with the shafts of the hinges 27 perpendicular to the longitudinal axis of the high pressure vessel 1, and by means of flexible sealing high pressure sleeve couplings 26. Analogously, the low pressure vessel 5 can also be made of more than one section connected by hinges to the horizontal shafts and flexible sealing low pressure sleeve couplings 30. In this case the high pressure gas tanks 2 are interconnected by flexible high pressure gas pipelines 25, and the low pressure gas tanks 7 by flexible low pressure gas pipelines 29.

Ballast systems 24 connected to flexible pipelines 38 are mounted on each section of the high pressure vessel 1. In the same manner, ballast systems 28 connected to flexible pipelines 31 are mounted to each section of the low pressure vessel 5. The ballast systems 24 and 28 are designed to achieve the submergence of the high pressure vessel 1 and the low pressure vessel 5 respectively, to a specified depth.

A stabilizer 55 for the vertical oscillations and those around the longitudinal axis is mounted to each section of the high pressure vessel 1 made of support beams 37 of the high pressure vessel 1, a horizontal stabilizer 35, and a vertical stabilizer 36. Analogously, to each section of the low pressure vessel 5 there is a stabilizer 56 for the vertical oscillations and those around the longitudinal axis made of support beams 41, horizontal stabilizer 39 and vertical stabilizer 40.

The oscillation compensation systems are submerged to a sufficient depth under the high pressure vessel 1 of the low pressure vessel 5.

The sea and ocean wave energy converter is fixed in at least two different points 23 (in the form of a winch) and 32 along the length of the device by means of flexible cord 33 of changing length, and by flexible cord 43 respectively of constant length for the first point of anchoring 34, and second point of anchoring 42 respectively, to the bottom of the sea. The point 32 of anchoring may also be in the form of a winch. The length of flexible cord 33 can be altered by means of the winches fitted to one or both of the vessels 1 and 5.

Figure 3:
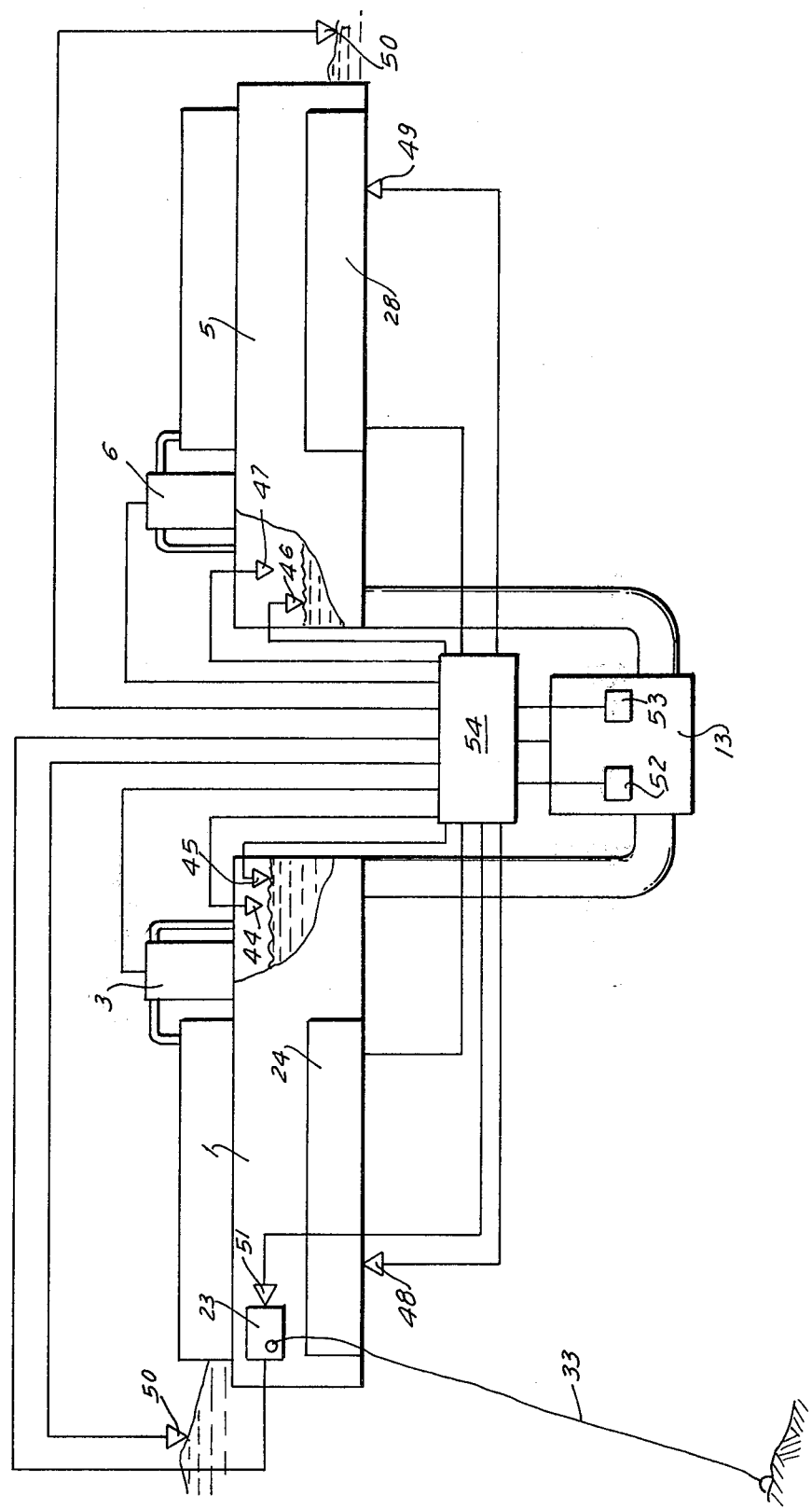
FIG. 3 is a diagram of the control unit.

As shown in FIG. 3, the sea and ocean wave energy converter is supplied with a system for the automatic control of the parameters of the gas cushions, the depth of submergence of the converter, the angle between the longitudinal axis of the converter and the wave crest, and the performance of the turbogenerator unit. The parameters of the high pressure cushion 4, or the low pressure gas cushion 8 respectively, are measured by the high pressure, or the low pressure, respectively, pressure sensors 44, or 47, respectively, for the high pressure cushion 4 and the low pressure gas cushion 8, and high pressure, or low pressure, respectively, sensors for level (level gauges) 45, and 46 for the water in the high pressure vessel 1, and the low pressure 5 vessel, respectively. The controls for changing the pressure in the high pressure 4 gas cushion, or the low pressure gas cushion 8, are respectively the high pressure compressor unit 3 or the low pressure compressor unit 6 for transferring gas in both directions.

The submergence depth of the high pressure vessel 4, or the low pressure vessel 5 is measured by at least one high pressure sensor 48, respectively low pressure sensor 49 for the depth of submergence of the high pressure vessel 1, or low pressure respectively, vessel 5. Two or more sensors 50 are provided for sea level supply information for the parameters of the wave heights. Sensor 51 supplies data for the length of the flexible cord 33 of changing length. Winch 23 is the control device for changing the angle between the longitudinal axis of the sea and ocean wave energy converter and the wave crest. The performance of the turbogenerator unit 13 is changed by controls 52 of the turbine and the controls 53 of the generator. The data from all of the sensors given above is sent by cables to a control unit 54. The signals from the control unit 54 are sent through their respective cables to all the controls given above.

The operation of the Converter, in accordance with this invention, is as follows:

When the wave crest is above a certain sector of the high pressure vessel 1, the water enters through the input valves 9 into the high pressure vessel 1 which in its top part has the high pressure cushion 4 where a flow is created which is converted into electric power by means of turbogenerator 13. The flow through the output valves 15 of the low pressure vessel 5, which has the low pressure cushion 8 in its upper part, is discharged in the low part of the wave. The main function of the gas cushions is to open and close the valves at the required moment. Thus when the wave crest is above a given section of the high pressure vessel 1, the hydrostatic pressure in the lower part of vessel 1 is larger than the pressure in the high pressure gas cushion 4. For this reason the input valves 9 open. Conversely, in sections of the high pressure vessel 1 which are in the lower part of the wave, the hydrostatic pressure which acts on the input valves 9 from outside is smaller than the internal pressure and valves 9 remain closed. Analogically we can explain the effect of the low pressure gas cushion 8. The second function of the gas cushions is to accumulate and discharge energy. The converter is oriented towards the wave crest at a sharp angle by means of winch 23.

The optimum depth of submergence of the high pressure vessel 1 and the low pressure vessel 5 is established either by the ballast systems 24, or 28, respectively, or if there are no ballast systems, by means of flexible cords 33 of changing length of which, in this case, there should be more than one.

In case of very rough seas, the converter still continues operation by submerging to a depth at which the destructive effect of the hurricane waves is sufficiently reduced.

In case that a series of waves of small amplitude which exercise less hydrostatic pressure enter the converter, the water level in the high pressure vessel 1 drops. In this moment the high pressure compressor unit 3 transfers part of the gas to the high pressure gas tank 2. In this way the danger of discharging gas from the high pressure vessel 1 is eliminated. When larger amplitude waves are encountered, the high pressure compressor unit supplies gas to the high pressure vessel 1 and obstructs the undesirable reduction of the volume of the high pressure gas cushion 4. The low compressor unit 6 operates in a similar manner.

Although the invention is illustrated and described with reference to one preferred embodiment thereof, it is to be expressly understood that it is in no way limited to the disclosure of such a preferred embodiment, but is capable of numerous modifications within the scope of the appended claims.

I claim:

1. In a device for converting the energy of sea and ocean waves having a submerged turbogenerator connected by means of pipelines to floating input and output elements on which there are mounted ballast systems and stabilizers, the improvement wherein the input and output elements are designed as a high-pressure vessel and a low-pressure vessel, respectively, with respective gas cushions and comprising a high-pressure compressor unit and a low-pressure compressor unit mounted on the high-pressure vessel and the low-pressure vessel, respectively, and connected to high-pressure and low-pressure gas tanks, respectively, and to respective gas cushions in respective closed circuits, each of said compressor units being operable to transfer gas in both directions between a respective gas tank and gas cushion, input valves in the high-pressure vessel for controlling the flow of water into the high-pressure vessel, and the low-pressure vessel is provided with an output guiding device and with output valves for controlling the flow of water out of the low-pressure vessel, wherein the said pipelines and flexible hoses, and comprising means for connecting the device at two different points to the sea bottom by means of at least two flexible cords of which at least one may be altered in length.

2. A device according to claim 1, comprising a plurality of high pressure vessels interconnected by hinge devices and flexible sleeve couplings each high pressure vessel having a respective gas tank.

3. A device according to claim 1, comprising a plurality of low pressure vessels interconnected by hinge devices and flexible sleeve couplings each low pressure vessel having a respective gas tank.

4. A device according to claim 1, wherein the input valves in the high-pressure vessel are in the form of a system of flat members disposed within such vessel and directed towards the turbogenerator, and the output guiding device of the low-pressure vessel includes at least two rows of blades situated externally and fitted to the low-pressure vessel, each row of blades of the output guiding device being symmetrically situated with respect to the other row of blades, the plane of symmetry being a vertical plane crossing the high-pressure vessel.

5. A device according to claim 1, wherein the length of the high pressure vessel is at least equal to the length of the waves usually received by the device.

* * * * *